(12) United States Patent
Haga et al.

(10) Patent No.: US 8,492,585 B2
(45) Date of Patent: Jul. 23, 2013

(54) METHOD FOR RECOVERING ANIONIC FLUORINATED EMULSIFIER

(75) Inventors: Junko Haga, Tokyo (JP); Yasuhiko Matsuoka, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/539,664

(22) Filed: Jul. 2, 2012

(65) Prior Publication Data

US 2012/0271065 A1 Oct. 25, 2012

Related U.S. Application Data

(63) Continuation of application No. PCT/JP2011/052175, filed on Feb. 2, 2011.

(30) Foreign Application Priority Data

Feb. 3, 2010 (JP) .................................. 2010-021754

(51) Int. Cl.
*B01J 49/00* (2006.01)
*B01J 41/04* (2006.01)
*B01D 15/04* (2006.01)
*C02F 1/42* (2006.01)

(52) U.S. Cl.
USPC ........................................................ 562/586

(58) Field of Classification Search
None
See application file for complete search history.

(56) References Cited

U.S. PATENT DOCUMENTS

| 4,282,162 A | 8/1981 | Kuhls |
| 6,436,244 B1 | 8/2002 | Führer et al. |
| 6,642,415 B1 | 11/2003 | Führer et al. |
| 2003/0098282 A1 | 5/2003 | Funaki et al. |
| 2004/0010156 A1 | 1/2004 | Kondo et al. |

FOREIGN PATENT DOCUMENTS

| JP | 63-002656 | 1/1988 |
| JP | 2001-062313 | 3/2001 |
| JP | 2002-059160 | 2/2002 |
| JP | 2003-094052 | 4/2003 |
| JP | 2003-512931 | 4/2003 |
| JP | 2003-220393 | 8/2003 |
| JP | 2003-285076 | 10/2003 |

OTHER PUBLICATIONS

International Search Report issued Apr. 12, 2011 in PCT/JP2011/052175 filed Feb. 2, 2011.

*Primary Examiner* — Yevegeny Valenrod
(74) *Attorney, Agent, or Firm* — Oblon, Spivak, McClelland, Maier & Neustadt, L.L.P.

(57) ABSTRACT

To provide a method for recovering an anionic fluorinated emulsifier, capable of easily and efficiently recovering an anionic fluorinated emulsifier adsorbed on a basic ion exchange resin.

A basic ion exchange resin is brought into contact with a mixture of an aqueous inorganic acid solution and a non-aqueous fluorinated medium, or the basic ion exchange resin is brought into contact with an aqueous inorganic acid solution and then brought into contact with a non-aqueous fluorinated medium, then a phase of the non-aqueous fluorinated medium is recovered, and an acid of the anionic fluorinated emulsifier is recovered from the phase of the non-aqueous fluorinated medium.

14 Claims, No Drawings

METHOD FOR RECOVERING ANIONIC FLUORINATED EMULSIFIER

TECHNICAL FIELD

The present invention relates to a method for recovering an anionic fluorinated emulsifier, which comprises eluting, from a basic ion exchange resin on which an anionic fluorinated emulsifier is adsorbed, the anionic fluorinated emulsifier and recovering it as an acid of the anionic fluorinated emulsifier.

BACKGROUND ART

In production of a fluoropolymer such as polytetrafluoroethylene (hereinafter referred to as PTFE), a melt-processable fluororesin or a fluoroelastomer by emulsion polymerization, an anionic fluorinated emulsifier which will not inhibit the polymerization reaction by chain transfer in an aqueous medium is commonly employed.

By agglomerating and drying an aqueous emulsion of a fluoropolymer obtainable by emulsion polymerization (hereinafter referred to as a fluoropolymer aqueous emulsion), a powder of a fluoropolymer is obtained. The powder of a fluoropolymer is used for various applications after forming e.g. by paste extrusion. Further, a nonionic surfactant or the like is added as the case requires to the fluoropolymer aqueous emulsion for stabilization treatment, followed by concentration, whereby a fluoropolymer aqueous dispersion containing a fluoropolymer at a high concentration can be obtained. The fluoropolymer aqueous dispersion can be used for various coating applications, for impregnation application, etc., after various compounding agents or the like are added as the case requires.

By the way, the anionic fluorinated emulsifier to be used for emulsion polymerization of a fluoropolymer is a substance which is not easily decomposed in the natural world. Accordingly, in recent years, it is desired to reduce the anionic fluorinated emulsifier contained not only in industrial waste but also in products such as a fluoropolymer aqueous emulsion or a fluoropolymer aqueous dispersion.

As a method for reducing the anionic fluorinated emulsifier, a method of bringing a liquid to be treated containing the anionic fluorinated emulsifier into contact with a basic ion exchange resin, so that the anionic fluorinated emulsifier in the liquid to be treated is adsorbed on the basic ion exchange resin may be mentioned. Further, as the anionic fluorinated emulsifier is expensive, an attempt to recover the anionic fluorinated emulsifier adsorbed on the basic ion exchange resin and recycle it has been made.

For example, Patent Document 1 discloses that a basic ion exchange resin on which an anionic fluorinated emulsifier is adsorbed is treated with a mixture of a diluted mineral acid with an organic solvent to recover it as an acid of the anionic fluorinated emulsifier. It is disclosed that the organic solvent is preferably a solvent such that when it is mixed with the same amount of water, at least 40% thereof is miscible, or it is infinitely miscible.

Further, Patent Document 2 discloses that a basic ion exchange resin on which an anionic fluorinated emulsifier is adsorbed, is brought into contact with a mixture of water, a solvent such as methanol and/or dimethyl monoglycol ether or dimethyl diglycol ether, and an alkali metal hydroxide ammonia solution, to elute the anionic fluorinated emulsifier bonded to the basic ion exchange resin.

Further, Patent Document 3 discloses that a basic ion exchange resin on which an anionic fluorinated emulsifier is adsorbed, is treated with an aqueous alkali solution containing water and an organic solvent. It discloses that the organic solvent is one in which water is dissolved or which is dissolved in water, and is preferably one in which at least 10 vol % of water is dissolved.

Further, Patent Document 4 discloses that a basic ion exchange resin on which an anionic fluorinated emulsifier is adsorbed is treated with a water-miscible organic solvent containing at least one ammonia and having a boiling point less than 150° C. Specifically, a mixture of ammonia with methanol is used.

PRIOR ART DOCUMENTS

Patent Documents

Patent Document 1: JP-B-63-2656
Patent Document 2: JP-A-2001-62313
Patent Document 3: JP-A-2002-59160
Patent Document 4: JP-A-2003-512931

DISCLOSURE OF INVENTION

Technical Problem

In such prior art, in recovery of the anionic fluorinated emulsifier which is adsorbed on the basic ion exchange resin, use of an acid or alkaline aqueous solution and a water soluble organic solvent basically represented by an alcohol, is fundamental.

However, an alcohol is flammable and is a water soluble organic solvent, a safety measure in its handling, and a technique to recover the anionic fluorinated emulsifier eluted in the alcohol, are necessary. Further, considering countermeasure against the COD (chemical oxygen demand) load of the waste, an easier and more efficient and inexpensive recovery technique has been desired.

Accordingly, the object of the present invention is to provide a method for recovering an anionic fluorinated emulsifier, capable of recovering an anionic fluorinated emulsifier which is adsorbed on a basic ion exchange resin, easily and efficiently.

Solution to Problem

The present invention provides the following.

[1] A method for recovering an anionic fluorinated emulsifier, which comprises eluting, from a basic ion exchange resin on which an anionic fluorinated emulsifier is adsorbed, the anionic fluorinated emulsifier and recovering it as an acid of the anionic fluorinated emulsifier, wherein the basic ion exchange resin is brought into contact with a mixture of an aqueous inorganic acid solution and a non-aqueous fluorinated medium, a phase of the non-aqueous fluorinated medium is recovered, and the acid of the anionic fluorinated emulsifier is recovered from the phase of the non-aqueous fluorinated medium.

[2] A method for recovering an anionic fluorinated emulsifier, which comprises eluting, from a basic ion exchange resin on which an anionic fluorinated emulsifier is adsorbed, the anionic fluorinated emulsifier and recovering it as an acid of the anionic fluorinated emulsifier, wherein the basic ion exchange resin is brought into contact with an aqueous inorganic acid solution and then brought into contact with a non-aqueous fluorinated medium, a phase of the non-aqueous fluorinated medium is recovered, and the acid of the anionic fluorinated emulsifier is recovered from the phase of the non-aqueous fluorinated medium.

[3] The method for recovering an anionic fluorinated emulsifier according to the above [2], wherein after the basic ion exchange resin is bought into contact with an aqueous inorganic acid solution, the basic ion exchange resin is separated and recovered, and then brought into contact with the non-aqueous fluorinated medium.

[4] The method for recovering an anionic fluorinated emulsifier according to any one of the above [1] to [3], wherein the ratio of the aqueous inorganic acid solution and the non-aqueous fluorinated medium is such that the aqueous inorganic acid solution/the non-aqueous fluorinated medium=5/95 to 95/5 by the mass ratio.

[5] The method for recovering an anionic fluorinated emulsifier according to any one of the above [1] to [4], wherein the ratio of the basic ion exchange resin, the aqueous inorganic acid solution and the non-aqueous fluorinated medium is such that the basic ion exchange resin/(total amount of the aqueous inorganic acid solution and the non-aqueous fluorinated medium)=60/40 to 1/99 by the mass ratio.

[6] The method for recovering an anionic fluorinated emulsifier according to any one of the above [1] to [5], wherein the acid of the anionic fluorinated emulsifier is a fluorinated carboxylic acid.

[7] The method for recovering an anionic fluorinated emulsifier according to the above [6], wherein the acid of the anionic fluorinated emulsifier is a $C_{5-7}$ fluorinated carboxylic acid which may have one to three etheric oxygen atoms.

[8] The method for recovering an anionic fluorinated emulsifier according to any one of the above [1] to [7], wherein the non-aqueous fluorinated medium is at least one member selected from the group consisting of a hydrofluorocarbon and a hydrofluoroether.

[9] The method for recovering an anionic fluorinated emulsifier according to the above [8], wherein the non-aqueous fluorinated medium is at least one member selected from the group consisting of $CF_3CH_2OCF_2CF_2H$, $CF_3CH_2OCF_2CFHCF_3$, $(CF_3)_2CHOCF_2CF_2H$, $CF_3CH_2OCHFCHF_2$, $CF_3(CF_2)_3OCH_3$, $CF_3(CF_2)_4OCH_3$, $CF_3(CF_2)_3OCH_2CH_3$, $CF_3(CF_2)_4OCH_2CH_3$, $(CF_3)_2CFCF_2OCH_2CH_3$, $CHF_2CF_2CF_2CF_2CF_3$, $CF_3CF_2CF_2CF_2CH_2CH_3$, $CF_3CF_2CF_2CF_2CF_2CH_2CH_3$, $CF_3CF_2CHFCHFCF_3$, $CF_3CH_2CF_2CH_3$ and $CF_3CF_2CF_2CFHCH_3$.

[10] The method for recovering an anionic fluorinated emulsifier according to any one of the above [1] to [9], wherein the aqueous inorganic acid solution is at least one member selected from the group consisting of an aqueous hydrochloric acid solution, an aqueous sulfuric acid solution, an aqueous nitric acid solution and an aqueous phosphoric acid solution.

[11] The method for recovering an anionic fluorinated emulsifier according to any one of the above [1] to [10], wherein the concentration of the aqueous inorganic acid solution is from 0.1N to 13N.

[12] The method for recovering an anionic fluorinated emulsifier according to any one of the above [1] to [11], wherein the basic ion exchange resin is a strongly basic ion exchange resin.

[13] The method for recovering an anionic fluorinated emulsifier according to the above [1] or [2], wherein the rest after the phase of the non-aqueous fluorinated medium is separated, is brought into contact with the non-aqueous fluorinated medium, the phase of the non-aqueous fluorinated medium is separated and recovered, and the acid of the anionic fluorinated emulsifier is recovered from the phase of the non-aqueous fluorinated medium.

[14] The method for recovering an anionic fluorinated emulsifier according to the above [3], wherein the rest after the phase of the non-aqueous fluorinated medium is separated, is (A) brought into contact with a mixture of the aqueous inorganic acid solution and the non-aqueous fluorinated medium or (B) brought into contact with the aqueous inorganic acid solution, and then brought into contact with the non-aqueous fluorinated medium, the phase of the non-aqueous fluorinated medium is separated and recovered, and the acid of the anionic fluorinated emulsifier is recovered from the phase of the non-aqueous fluorinated medium.

Advantageous Effects of Invention

According to the present invention, a basic ion exchange resin on which an anionic fluorinated emulsifier is adsorbed, is brought into contact with a mixture of an aqueous inorganic acid solution and a non-aqueous fluorinated medium, or brought into contact with an aqueous inorganic acid solution and then brought into contact with a non-aqueous fluorinated medium, whereby the anionic fluorinated emulsifier which is adsorbed on the basic ion exchange resin is converted into an acid form by the aqueous inorganic acid solution and is eluted in the non-aqueous fluorinated medium. Accordingly, the non-aqueous fluorinated medium contains a large amount of the anionic fluorinated emulsifier which is eluted from the basic ion exchange resin, as an acid of the anionic fluorinated emulsifier, and by a known method such as a method of recovering a phase of the non-aqueous fluorinated medium, followed by distillation, the acid of the anionic fluorinated emulsifier can efficiently be recovered.

As mentioned above, according to the present invention, the acid of the anionic fluorinated emulsifier can efficiently be recovered without use of a flammable and water soluble organic solvent. Further, the non-aqueous fluorinated medium after the acid of the anionic fluorinated emulsifier is recovered, can be recycled, thus leading to labor saving in waste treatment. Further, the recovered acid of the anionic fluorinated emulsifier can be used for emulsion polymerization of a fluoropolymer as it is or as an ammonium salt, an alkali metal salt or the like after neutralized.

DESCRIPTION OF EMBODIMENTS

In this specification, an acid of an anionic fluorinated emulsifier means an acid-form anionic fluorinated emulsifier. Further, a non-aqueous fluorinated medium means a fluorinated medium having a solubility in water at 25° C. of less than 0.1%.

In the present invention, the basic ion exchange resin on which the anionic fluorinated emulsifier is to be adsorbed may be a strongly basic ion exchange resin or a weakly basic ion exchange resin. It is preferably a strongly basic ion exchange resin. The strongly basic ion exchange resin is hardly susceptible to influence by the pH of the liquid to be treated containing the anionic fluorinated emulsifier, and can maintain a high adsorption efficiency.

The basic ion exchange resin may, for example, be a particulate resin of e.g. a styrene-divinylbenzene crosslinked resin, an acrylic-divinylbenzene crosslinked resin or a cellulose resin, having amino groups and/or quaternary ammonium bases as ion exchange groups. Among them, preferred is a particulate resin of a styrene-divinylbenzene crosslinked resin having quaternary ammonium bases as ion exchange groups.

The average particle size of the basic ion exchange resin is preferably from 0.1 to 2 mm, more preferably from 0.2 to 1.3 mm, particularly preferably from 0.3 to 0.8 mm. When the average particle size of the basic ion exchange resin is within the above range, for example, when a liquid to be treated containing an anionic fluorinated emulsifier is passed through a column packed with the basic ion exchange resin so that the anionic fluorinated emulsifier is adsorbed, the path of the liquid to be treated is less likely to be clogged.

The ion exchange capacity of the basic ion exchange resin is preferably from 0.5 to 2.5 (eq/L (liter)), more preferably from 0.8 to 1.7 (eq/L). When the ion exchange capacity of the basic ion exchange resin is within the above range, the anionic fluorinated emulsifier in the liquid to be treated can efficiently be adsorbed.

As commercially available products of the basic ion exchange resin, Lewatit (registered trademark) MP800OH, Lewatit (registered trademark) M800KR or Lewatit (registered trademark) MP600 manufactured by LANXESS, or PUROLITE (registered trademark) A200MBOH manufactured by Purolite International K.K. may, for example, be mentioned.

In the present invention, the anionic fluorinated emulsifier to be adsorbed on the basic ion exchange resin is not particularly limited. It may, for example, be a fluorinated carboxylic acid which may have an etheric oxygen atom or its salt, or a fluorinated sulfonic acid or its salt. The salt may, for example, be an ammonium salt or an alkali metal salt (e.g. Li, Na or K), and is preferably an ammonium salt. Particularly, a fluorinated carboxylic acid which may have an etheric oxygen atom or its salt is preferred, and a $C_{5-7}$ fluorinated carboxylic acid which may have one to three etheric oxygen atoms or its salt is more preferred.

The fluorinated carboxylic acid may, for example, be specifically a perfluorocarboxylic acid, a perfluorocarboxylic acid having an etheric oxygen atom, or a fluorinated carboxylic acid having a hydrogen atom.

The perfluorocarboxylic acid may, for example, be perfluorohexanoic acid, perfluoroheptanoic acid, perfluorooctanoic acid or perfluorononanoic acid.

The prefluorocarboxylic acid having an etheric oxygen atom may, for example, be $C_3F_7OCF(CF_3)CF_2OCF(CF_3)COOH$, $C_4F_9OC_2F_4OCF_2COOH$, $C_3F_7OC_2F_4OCF_2COOH$, $C_2F_5OC_2F_4OCF_2COOH$, $C_2F_5OCF_2CF_2OCF_2CF_2OCF_2COOH$, $C_2F_5O(CF_2)_5COOH$, $CF_3OC_2F_4OCF_2COOH$, $CF_3OCF_2OCF_2OCF_2COOH$, $CF_3OCF_2OCF_2OCF_2OCF_2COOH$, $CF_3O(CF_2CF_2O)_2CF_2COOH$, $CF_3OCF_2CF_2CF_2OCF_2COOH$, $C_4F_9OCF_2COOH$, $C_4F_9OCF_2CF_2COOH$, $CF_3OCF(CF_3)CF_2OCF(CF_3)COOH$ or $C_4F_9OCF(CF_3)COOH$.

The fluorinated carboxylic acid having a hydrogen atom may, for example, be ω-hydroperfluorooctanoic acid, $C_3F_7OCF(CF_3)CF_2OCHFCOOH$, $CF_3CFHO(CF_2)_5COOH$, $CF_3O(CF_2)_3OCHFCF_2COOH$, $CF_3O(CF_2)_3OCHFCOOH$, $C_3F_7OCHFCF_2COOH$ or $CF_3CFHO(CF_2)_3COOH$.

The fluorinated sulfonic acid may, for example, be perfluorooctane sulfonic acid or $C_6F_{13}CH_2CH_2SO_3H$.

In the present invention, the basic ion exchange resin on which the anionic fluorinated emulsifier is adsorbed is obtainable by bringing a liquid to be treated containing the anionic fluorinated emulsifier into contact with a basic ion exchange resin. That is, by bringing a liquid to be treated into contact with a basic ion exchange resin, the anionic fluorinated emulsifier in the liquid to be treated is adsorbed on the basic ion exchange resin. For example, in a case where a liquid to be treated containing, as the anionic fluorinated emulsifier, $CF_3CF_2OCF_2CF_2OCF_2COO^-(NH_4)^+$ is brought into contact with the basic ion exchange resin, it is considered that ions of $CF_3CF_2OCF_2CF_2OCF_2COO^-$ are adsorbed on the basic ion exchange resin by being bonded to the base.

The liquid to be treated containing the anionic fluorinated emulsifier may, for example, be (1) a fluoropolymer aqueous dispersion obtained by subjecting a fluoromonomer to emulsion polymerization in the presence of the anionic fluorinated emulsifier, and adding a nonionic surfactant to the obtained fluoropolymer aqueous emulsion for stabilization, followed by concentration as the case requires, (2) a waste containing the anionic fluorinated emulsifier discharged after the above fluoropolymer aqueous emulsion is agglomerated, or (3) an aqueous solution which has absorbed the anionic fluorinated emulsifier contained in the air discharged in the procedure of drying a fluoropolymer agglomerate obtained by agglomerating the above fluoropolymer aqueous emulsion.

The fluoropolymer aqueous dispersion is preferably a fluoropolymer aqueous dispersion having a fluoropolymer aqueous emulsion stabilized by a nonionic surfactant. The nonionic surfactant may, for example, be a surfactant represented by the formula (A) and/or (B):

$$R^1—O-A-H \quad (A)$$

(wherein $R^1$ is a $C_{8-18}$ alkyl group, and A is a polyoxyalkylene chain constituted by 5 to 20 oxyethylene groups and 0 to 2 oxypropylene groups;

$$R^2—C_6H_4—O—B—H \quad (B)$$

(wherein $R^2$ is a $C_{4-12}$ alkyl group, and B is a polyoxyethylene chain constituted by 5 to 20 oxyethylene groups.

In the formula (A), the alkyl group as $R^1$ has from 8 to 18 carbon atoms, preferably from 10 to 16 carbon atoms, more preferably from 12 to 16 carbon atoms. If the alkyl group has carbon atoms more than this range, such a surfactant is difficult to handle, since the flow temperature is high. Further, if the PTFE aqueous dispersion is left to stand for a long term, PTFE fine particles are likely to be sedimented, whereby the storage stability tends to be impaired. Further, if the alkyl group has carbon atoms smaller than this range, the surface tension of the PTFE aqueous dispersion tends to be high, and wettability at the time of coating tends to be decreased.

$R^1$ may be linear or branched, but is preferably linear.

In the formula (B), the alkyl group as $R^2$ has from 4 to 12 carbon atoms, preferably from 6 to 10 carbon atoms, more preferably from 8 to 9 carbon atoms. If the alkyl group has carbon atoms smaller than this range, the surface tension of the PTFE aqueous dispersion tends to be high, and wettability at the time of coating tends to be decreased. Further, if the alkyl group has carbon atoms more than this range, if the PTFE aqueous dispersion is left to stand for a long term, PTFE fine particles are likely to be sedimented, whereby the storage stability tends to be impaired.

$R^2$ may be linear or branched, but is preferably linear.

The nonionic surfactant of the formula (A) may, for example, be specifically a nonionic surfactant having a molecular structure of e.g. $C_{13}H_{27}—(OC_2H_4)_{10}—OH$, $C_{12}H_{25}—(OC_2H_4)_{10}—OH$, $C_{10}H_{21}CH(CH_3)CH_2—(OC_2H_4)_9—OH$, $C_{13}H_{27}—(OC_2H_4)_8—OCH(CH_3)CH_2—OH$, $C_{16}H_{33}—(OC_2H_4)_{10}—OH$ or $CH(C_5H_{11})(C_7H_{15})—(OC_2H_4)_9—OH$. As commercially available products, TERGITOL (registered trademark) 15S series manufactured by The Dow Chemical Company, Newcol (registered trademark) series manufactured by NIPPON NYUKAZAI CO., LTD. or LIONOL (registered trademark) TD series manufactured by Lion Corporation may, for example, be mentioned.

The nonionic surfactant of the formula (B) may, for example, be specifically a nonionic surfactant having a molecular structure of e.g. $C_8H_{17}—C_6H_4—(OC_2H_4)_{10}—OH$ or $C_9H_{19}$—$C_6H_4$—$(OC_2H_4)_{10}$—OH. As commercially available products, TRITON (registered trademark) X series manufactured by The Dow Chemical Company, or NIKKOL (registered trademark) OP series or NP series manufactured by Nikko Chemical Co., Ltd. may, for example, be mentioned.

The content of the nonionic surfactant of the formula (A) and/or the formula (B) in the fluoropolymer aqueous dispersion is preferably from 1 to 20 mass % based on the mass of the fluoropolymer, more preferably from 1 to 10 mass %, particularly preferably from 2 to 8 mass %.

The method of contact of the liquid to be treated containing the anionic fluorinated emulsifier and the basic ion exchange resin is not particularly limited, and a known method may be mentioned. For example, a method of charging the basic ion exchange resin in the liquid to be treated, followed by stirring or shaking, or a method of passing the liquid to be treated through a column packed with the basic ion exchange resin may, for example, be mentioned. Further, prior to contact of the liquid to be treated with the basic ion exchange resin, it is preferred to subject the liquid to be treated to filtration so as to remove e.g. floating solids such as agglomerates, whereby e.g. clogging of the basic ion exchange resin can be suppressed. Filtration of the liquid to be treated is carried out preferably by using a single filter or a group of several filters, having a pore size of from 100 to 300 μm.

The contact temperature when the liquid to be treated containing the anionic fluorinated emulsifier is brought into contact with the basic ion exchange resin is not particularly limited and may properly be selected, but is preferably around room temperature of from 10 to 40° C. Further, the contact time is not particularly limited and may properly be selected. For example, in the case of contact by a stirring method, the contact time is preferably from 10 minutes to 200 hours. Further, the pressure at the time of contact is preferably atmospheric pressure, but may be reduced pressure or elevated pressure.

In such a manner, the anionic fluorinated emulsifier in the liquid to be treated is adsorbed on the basic ion exchange resin, and then the basic ion exchange resin is separated.

According to a first embodiment of the method for recovering an anionic fluorinated emulsifier of the present invention, first, the above-separated basic ion exchange resin on which the anionic fluorinated emulsifier is adsorbed, is brought into contact with a mixture of an aqueous inorganic acid solution and a non-aqueous fluorinated medium (hereinafter the mixture of an aqueous inorganic acid solution and a non-aqueous fluorinated medium will be referred to as an eluent).

By bringing the basic ion exchange resin into contact with the eluent, the anionic fluorinated emulsifier adsorbed on the basic ion exchange resin is converted to an acid form by the aqueous inorganic acid solution and becomes easily eluted. Further, since the anionic fluorinated emulsifier has good compatibility with the non-aqueous fluorinated medium, the anionic fluorinated emulsifier adsorbed on the basic ion exchange resin is eluted as an acid of the anionic fluorinated emulsifier into the non-aqueous fluorinated medium.

Here, it is considered that even if the basic ion exchange resin is brought into contact with the aqueous inorganic acid solution, the acid of the anionic fluorinated emulsifier is not substantially eluted into the aqueous inorganic acid solution and remains attached to the surface of the basic ion exchange resin. Accordingly, as shown in the after-mentioned Comparative Example 1, substantially no acid of the anionic fluorinated emulsifier can be recovered, if the basic ion exchange resin is brought into contact with the aqueous inorganic acid solution, the basic ion exchange resin is separated by filtration, and to the recovered phase of the aqueous inorganic acid solution, the non-aqueous fluorinated medium is added and mixed.

In the present invention, the method of contact of the basic ion exchange resin and the eluent is not particularly limited. For example, mechanical stirring by a stirrer or shaking may be mentioned. Further, in order to improve the contact efficiency of the basic ion exchange resin and the eluent, the stirring intensity is preferably higher within a range where particles of the basic ion exchange resin are not destroyed. When particles of the basic ion exchange resin are not destroyed, the basic ion exchange resin can easily be reused for adsorption of the anionic fluorinated emulsifier.

In the present invention, the basic ion exchange resin on which the anionic fluorinated emulsifier is adsorbed, after brought into contact with the liquid to be treated containing the anionic fluorinated emulsifier so that the anionic fluorinated emulsifier in the liquid to be treated is adsorbed, may be used in a wet state without drying treatment or the like, or may be used in a dry state after a drying treatment. Industrially, it is preferred to use it in a wet state, whereby the procedure can be simplified.

In the present invention, the aqueous inorganic acid solution is preferably at least one member selected from the group consisting of an aqueous hydrochloric acid solution, an aqueous nitric acid solution, an aqueous sulfuric acid solution and an aqueous phosphoric acid solution, Two or more of the above aqueous inorganic acid solutions may be used as mixed. Among them, an aqueous hydrochloric acid solution is particularly preferred since it is industrially easily used.

In general, the higher the concentration of the aqueous inorganic acid solution, the more the acid of the anionic fluorinated emulsifier eluted from the basic ion exchange resin tends to increase, such being preferred. The concentration is preferably from 0.1N to 13N, more preferably from 3N to 13N, particularly preferably from 10N to 13N.

In the present invention, as the non-aqueous fluorinated medium, at least one member selected from the group consisting of a hydrofluorocarbon and a hydrofluoroether is preferably used. Among them, a hydrofluoroether, which has low global warming potential and ozone depletion potential, is particularly preferred.

The hydrofluoroether may, for example, be $CF_3CH_2OCF_2CF_2H$, $CF_3CH_2OCF_2CFHCF_3$, $(CF_3)_2CHOCF_2CF_2H$, $CF_3CH_2OCHFCHF_2$, $CF_3(CF_2)_3OCH_3$, $CF_3(CF_2)_4OCH_3$, $CF_3(CF_2)_3OCH_2CH_3$, $CF_3(CF_2)_4OCH_2CH_3$ or $(CF_3)_2CFCF_2OCH_2CH_3$.

The hydrofluorocarbon may, for example, be $CHF_2CF_2CF_2CF_2CF_3$, $CF_3CF_2CF_2CF_2CH_2CH_3$, $CF_3CF_2CF_2CF_2CF_2CH_2CH_3$, $CF_3CF_2CHFCHFCF_3$, $CF_3CH_2CF_2CH_3$ or $CF_3CF_2CF_2CFHCH_3$.

Each of the above hydrofluorocarbon and hydrofluoroether has a solubility in water of less than 0.1%. Further, they are nonflammable media and are excellent in the handling efficiency.

The ratio of the aqueous inorganic acid solution and the non-aqueous fluorinated medium is preferably such that the aqueous inorganic acid solution/non-aqueous fluorinated medium=5/95 to 95/5, more preferably 20/80 to 80/20, particularly preferably 30/70 to 70/30, by the mass ratio. When the mass ratio of the aqueous inorganic acid solution and the non-aqueous fluorinated medium is within the above range, the recovery rate of the acid of the anionic fluorinated emulsifier tends to be high. Particularly, the closer to 50/50, the better the mixing properties, and the higher the recovery rate of the acid of the anionic fluorinated emulsifier.

The ratio of the basic ion exchange resin on which the anionic fluorinated emulsifier is adsorbed, the aqueous inorganic acid solution and the non-aqueous fluorinated medium is preferably such that the basic ion exchange resin/(total amount of the aqueous inorganic acid solution and the non-aqueous fluorinated medium)=60/40 to 1/99, more preferably 55/45 to 10/90, particularly preferably 50/50 to 30/70, by the mass ratio. If the total amount of the aqueous inorganic acid solution and the non-aqueous fluorinated medium based on the basic ion exchange resin is too high, the contact efficiency tends to be decreased, and the recovery rate of the acid of the anionic fluorinated emulsifier tends to be decreased. Further, if the total content is too low, the miscibility tends to be decreased, and the recovery rate of the acid of the anionic fluorinated emulsifier tends to be decreased. Within the above range, the miscibility is good, and further, the recovery rate of the acid of the anionic fluorinated emulsifier is high.

Then, in the present invention, a phase of the non-aqueous fluorinated medium is separated and recovered from the mixture of the basic ion exchange resin on which the anionic fluorinated emulsifier is adsorbed, and the eluent.

As the compatibility of the aqueous inorganic acid solution with the non-aqueous fluorinated medium is very low, only by leaving the above mixture at rest for example, the mixture is separated into a phase of the aqueous inorganic acid solution and a phase of the non-aqueous fluorinated medium. Accordingly, in the present invention, a phase of the non-aqueous fluorinated medium containing a large amount of the acid of the anionic fluorinated emulsifier can be separated and recovered only by a very simple operation of e.g. recovering the separated supernatant liquid, without use of a particularly complicated recovery apparatus or the like.

Further, the acid of the anionic fluorinated emulsifier can be recovered e.g. by subjecting the separated and recovered phase of the non-aqueous fluorinated medium to distillation. The recovered acid of the anionic fluorinated emulsifier may be used as the anionic fluorinated emulsifier as it is, or may be used as an ammonium salt, an alkali metal salt or the like after neutralized.

In the present invention, an operation may be repeated once or more, such that to the rest after the phase of the non-aqueous fluorinated medium is separated from the mixture of the basic ion exchange resin and the eluent, the non-aqueous fluorinated medium is newly added and mixed, the mixture is left at rest, then the phase of the non-aqueous fluorinated medium is separated and recovered, and the acid of the anionic fluorinated emulsifier is recovered from the phase of the non-aqueous fluorinated medium.

By repeatedly carrying out the above operation, that is, by increasing the number of contact of the basic ion exchange resin with the eluent, the recovery rate of the acid of the anionic fluorinated emulsifier can be increased. For example, by bringing the basic ion exchange resin into contact with the eluent, 45 mass % or more of the acid of the anionic fluorinated emulsifier can be eluted (first contact). Then, the non-aqueous fluorinated medium is newly added to and mixed with the rest after the phase of the non-aqueous fluorinated medium is separated, so that they are contacted (second contact), 70 mass % or more in total of the acid of the anionic fluorinated emulsifier can be eluted. By further carrying out the same operation to increase the number of contact of the basic ion exchange resin with the eluent, finally almost 100% of the anionic fluorinated emulsifier can be eluted. The procedure will be complicated as the number of contact increases, and accordingly the number of contact is preferably at most 5. At the time of the second and subsequent contact, a non-aqueous fluorinated medium having the eluted anionic fluorinated emulsifier removed from the non-aqueous fluorinated medium once contacted with the basic ion exchange resin may be recycled, but it is preferred to use a new non-aqueous fluorinated medium.

Now, a second embodiment of the method for recovering an anionic fluorinated emulsifier of the present invention will be described.

According to the second embodiment, the basic ion exchange resin on which the anionic fluorinated emulsifier is adsorbed is brought into contact with the aqueous inorganic acid solution, and then brought into contact with the non-aqueous fluorinated medium.

As described above, by bringing the basic ion exchange resin into contact with the aqueous inorganic acid solution, the anionic fluorinated emulsifier adsorbed on the basic ion exchange resin is converted to an acid form and is adsorbed on the basic ion exchange resin in a state where it is easily eluted. Since the anionic fluorinated emulsifier has low compatibility with aqueous inorganic acid solution, it will not substantially eluted into the aqueous inorganic acid solution even when converted to an acid form. However, since the non-aqueous fluorinated medium has good compatibility with the anionic fluorinated emulsifier, by bringing the basic ion exchange resin contacted with the aqueous inorganic acid solution into contact with the non-aqueous fluorinated medium, the anionic fluorinated emulsifier adsorbed on the basic ion exchange resin is eluted as an acid of the anionic fluorinated emulsifier into the non-aqueous fluorinated medium. Then, in the same manner as the first embodiment, by recovering a phase of the non-aqueous fluorinated medium, a phase of the non-aqueous fluorinated medium containing a large amount of the acid of the anionic fluorinated emulsifier can be recovered, and the acid of the anionic fluorinated emulsifier can be recovered e.g. by subjecting the recovered phase of the non-aqueous fluorinated medium to distillation.

In the second embodiment, after the basic ion exchange resin is brought into contact with the aqueous inorganic acid solution, it is preferred to separate and recover the basic ion exchange resin from their mixture and to bring the separated and recovered basic ion exchange resin into contact with the non-aqueous fluorinated medium, whereby when the phase of the non-aqueous fluorinated medium is recovered, the phase of the non-aqueous fluorinated medium can be recovered from the mixture of the basic ion exchange resin and the non-aqueous fluorinated medium by a very easy operation such as removal of the basic ion exchange resin by filtration.

In the second embodiment, the ratio of the basic ion exchange resin on which the anionic fluorinated emulsifier is adsorbed, to the aqueous inorganic acid solution, is preferably from 80/20 to 2/98, more preferably from 75/25 to 20/80, by the mass ratio. Further, the ratio of the basic ion exchange resin to the non-aqueous fluorinated medium is preferably from 80/20 to 2/98, more preferably from 75/25 to 20/80, by the mass ratio. Within the above range, the recovery rate of the acid of the anionic fluorinated emulsifier is high.

In the second embodiment also, in the same manner as the above first embodiment, an operation of recovering the anionic fluorinated emulsifier by the aqueous inorganic acid solution and the non-aqueous fluorinated medium from the rest after the phase of the non-aqueous fluorinated medium is separated, may be repeatedly carried out once or more.

In a case where after the basic ion exchange resin is brought into contact with the aqueous inorganic acid solution, and then an operation of bringing the basic ion exchange resin separated and recovered from the mixture into contact with the non-aqueous fluorinated medium is carried out, "the rest after the phase of the non-aqueous fluorinated medium is separated" mainly comprises the basic ion exchange resin, and accordingly in such a case, it is preferred that the rest after the phase of the non-aqueous fluorinated medium is separated is (A) brought into contact with a mixture of the aqueous inorganic acid solution and the non-aqueous fluorinated medium, or (B) brought into contact with the aqueous inorganic acid solution, and then brought into contact with the non-aqueous fluorinated medium, the phase of the non-aqueous fluorinated medium is recovered, and the anionic fluorinated emulsifier is recovered from the phase of the non-aqueous fluorinated medium.

EXAMPLES

Now, the present invention will be described in further detail with reference to Examples and Comparative Examples, however, the present invention is by no means restricted thereto. Methods for measuring physical properties disclosed in Examples are as follows.

(A) Average primary particle size (unit: μm) of PTFE (polytetrafluoroethylene): Measured by a laser scattering type particle size distribution analyzer (manufactured by HORIBA, Ltd., tradename "LA-920").

(B) Standard specific gravity (hereinafter referred to also as SSG): Measured in accordance with ASTM D1457-91a, D4895-91a. 12.0 g of PTFE was weighed and held for 2 minutes under 34.5 MPa in a cylindrical mold having an inner diameter of 28.6 mm. This was put in an over of 290° C. and heated at a rate of 120° C./hr. After being held at 380° C. for 30 minutes, it was cooled at a rate of 60° C./hr and held at 294° C. for 24 minutes. Then, it was held in a desiccator of 23° C. for 12 hours, and then the specific gravity ratio of the molded product at 23° C. to water was measured and regarded as the standard specific gravity.

(C) Concentrations of anionic fluorinated emulsifier and acid of anionic fluorinated emulsifier: In a glass bottle, 4 mL of a methylene blue solution (obtained by gradually adding 12 g of sulfuric acid to about 500 mL of water, followed by cooling, dissolving 0.03 g of methylene blue and 50 g of anhydrous sodium sulfate therein, and adding water to make 1 L of the solution) and 5 mL of chloroform were added, and 0.1 g of a measurement sample diluted 1,000 to 3,000 times was added and vigorously stirred, the mixture was left at rest, and a chloroform phase as a bottom phase was collected. The collected chloroform phase was subjected to filtration through a filter having a pore size of 0.2 μm, and the absorbance at 630 nm was measured by a spectrophotometer. The chloroform phase shows a blue color depending upon the amount of the anionic fluorinated emulsifier. A calibration curve was prepared by measuring the absorbance in the same method by using 0.1 g of the anionic fluorinated emulsifier having a known concentration, and using the calibration curve, the concentration of the anionic fluorinated emulsifier in the measurement sample was determined. In the same manner, the concentration of the acid of the anionic fluorinated emulsifier in the measurement sample was determined.

Example 1

100 mL of a 1.5 mass % aqueous solution of a nonionic surfactant (tradename: "Newcol (registered trademark) 1308FA" manufactured by NIPPON NYUKAZAI CO., LTD.) was passed at a rate of 50 cc per hour through a column (internal volume: 51 cc) having a length of 80 cm and an inner diameter of 0.9 cm packed with a strongly basic ion exchange resin (tradename: "PUROLITE (registered trademark) A200MBOH" manufactured by Purolite International K.K.) by a tubular pump, and then 23.0 kg of a PTFE aqueous dispersion (PTFE concentration: 29.4%, average primary particle size of PTFE: 300 nm, standard specific gravity of PTFE: 2.20) containing an anionic fluorinated emulsifier ($CF_3CF_2OCF_2CF_2OCF_2COO^-(NH_4)^+$) in an amount of 0.471 mass % based on the mass of PTFE, was passed at a rate of 120 cc per hour over a period of about 195 hours. The anionic fluorinated emulsifier in the PTFE aqueous dispersion after passage was reduced to 0.0471 mass % based on the mass of PTFE.

In the PTFE aqueous dispersion before passage, by calculation, 31.9 g of the anionic fluorinated emulsifier was contained. Further, 3.18 g of the anionic fluorinated emulsifier was contained in the PTFE aqueous dispersion after passage. Accordingly, it is considered that 28.7 g of the anionic fluorinated emulsifier is adsorbed on the basic ion exchange resin after passage. This strongly basic ion exchange resin was dried in an oven at from 50 to 60° C. for about 12 hours until the mass became constant, whereby 44.6 g of the basic ion exchange resin was obtained, and it is considered that 0.643 g of the anionic fluorinated emulsifier was adsorbed per 1 g.

In a 30 cc glass bottle in which a stirrer was put, 1.01 g of the above dried strongly basic ion exchange resin, 0.300 g of a 11N aqueous hydrochloric acid solution and 0.939 g of $CF_3CH_2OCHFCHF_2$ (tradename: "ASAHIKLIN (registered trademark) AE-3000", manufactured by Asahi Glass Company, Limited) (hereinafter referred to also as AE-3000) as the non-aqueous fluorinated medium, were put and stirred at room temperature for 100 minutes. Then, the mixture was left at rest, and a separated phase of AE-3000 was recovered, whereupon the concentration of the acid of the anionic fluorinated emulsifier ($CF_3CF_2OCF_2CF_2OCF_2COOH$) in the phase was measured. In the recovered phase of AE-3000, 0.310 g of the acid of the anionic fluorinated emulsifier was contained. The recovery rate of the acid of the anionic fluorinated emulsifier was 47.8%.

Examples 2 to 6

In the same manner as in Example 1 except that the amounts of the 11N aqueous hydrochloric acid solution and AE-3000 were changed as identified in Table 1, the phase of AE-3000 was recovered, and the concentration of the acid of the anionic fluorinated emulsifier in the phase was measured. The results are shown in Table 1.

TABLE 1

| | Ex. 1 | Ex. 2 | Ex. 3 | Ex. 4 | Ex. 5 | Ex. 6 |
|---|---|---|---|---|---|---|
| 11N aqueous hydrochloric acid solution (g) | 0.30 | 1.20 | 4.80 | 2.40 | 3.60 | 4.30 |
| AE-3000 (g) | 0.939 | 3.82 | 15.7 | 2.45 | 1.22 | 0.523 |
| Strongly basic ion exchange resin (g) | 1.01 | 0.99 | 1.00 | 1.00 | 1.00 | 1.00 |
| 11N aqueous hydrochloric acid solution/AE-3000 (mass ratio) | 24/76 | 24/76 | 23/77 | 49/51 | 75/25 | 89/11 |
| Strongly basic ion exchange resin/(11N aqueous hydrochloric acid solution + AE-3000) (mass ratio) | 45/55 | 16/84 | 5/95 | 17/83 | 17/83 | 17/83 |
| Recovery rate (%) | 47.8 | 38.5 | 24.5 | 52.8 | 48.0 | 11.9 |

Example 7

A strongly basic ion exchange resin (tradename: "PUROLITE (registered trademark) A200MBOH" manufactured by Purolite International K.K.) was put in 8.96 kg of an aqueous solution containing 29.9 mass % of an anionic fluorinated emulsifier ($CF_3CF_2OCF_2CF_2OCF_2COO^-(NH_4)^+$), followed by stirring for 110 hours, and then the strongly basic ion exchange resin was separated from the aqueous solution of the anionic fluorinated emulsifier. In the aqueous solution of the anionic fluorinated emulsifier after stirring, the concentration of the anionic fluorinated emulsifier was reduced to 13.0 mass %. Accordingly, it is considered that 1.51 kg of the anionic fluorinated emulsifier was adsorbed on the strongly basic ion exchange resin. The mass of the strongly basic ion exchange resin used was 3.27 kg (moisture content: 14.4%), whereupon it is considered that 0.462 g of the anionic fluorinated emulsifier was adsorbed per 1 g of the obtained strongly basic ion exchange resin.

In a 140 cc glass bottle, 10.1 g of the strongly basic ion exchange resin on which the anionic fluorinated emulsifier was adsorbed obtained by the above operation, 25.0 g of a 11N aqueous hydrochloric acid solution and 25.5 g of AE-3000 were put, followed by shaking by a shaking apparatus (tradename: "SHAKER S-31", manufactured by YAMATO SCIENTIFIC CO., LTD.) for 60 minutes. The glass bottle was left at rest, and a separated phase of AE-3000 was recovered, whereupon the concentration of the acid of the anionic fluorinated emulsifier in the phase was measured. In the recovered phase of AE-3000, 2.67 g of the acid of the anionic fluorinated emulsifier was contained. The recovery rate of the acid of the anionic fluorinated emulsifier was 57.2%.

Example 8

In Example 7, after the AE-3000 phase was separated, to the remaining mixture of the basic ion exchange resin and the aqueous hydrochloric acid solution, 25.1 g of AE-3000 was newly added, followed by shaking by a shaking apparatus for 60 minutes. Then, the glass bottle was left at rest, and a separated phase of AE-3000 was recovered, whereupon the concentration of the acid of the anionic fluorinated emulsifier in the phase was measured. In the recovered phase of AE-3000, 1.16 g of the acid of the anionic fluorinated emulsifier was contained. The recovery rate of the acid of the anionic fluorinated emulsifier was 24.9%. By the operation in Examples 7 and 8, the recovery rate of the acid of the anionic fluorinated emulsifier was 82.1% in total.

Comparative Example 1

In a 140 cc glass bottle, 10.3 g of the strongly basic ion exchange resin on which the anionic fluorinated emulsifier was adsorbed obtained in Example 7 and 25.0 g of a 11N aqueous hydrochloric acid solution were put, followed by shaking by a shaking apparatus for 60 minutes Then, the ion exchange resin was removed by filtration, and to the remaining aqueous hydrochloric acid solution phase, 25.3 g of AE-3000 was added, followed by shaking for 60 minutes. The glass bottle was left at rest, and a separated phase of AE-3000 was recovered, whereupon the concentration of the acid of the anionic fluorinated emulsifier in the phase was measured. In the recovered phase of AE-3000, 62.9 mg of the acid of the anionic fluorinated emulsifier was contained. The recovery rate of the acid of the anionic fluorinated emulsifier was 1.32%.

Example 9

In a 600 cc beaker, 20.0 g of the strongly basic ion exchange resin on which the anionic fluorinated emulsifier was adsorbed obtained in Example 7, 50.0 g of a 11N aqueous hydrochloric acid solution and 50.0 g of AE-3000 were put, followed by stirring for 60 minutes. Then, the beaker was left at rest, and a separated phase of AE-3000 was recovered, whereupon the concentration of the acid of the anionic fluorinated emulsifier in the phase was measured. In the recovered phase of AE-3000, 4.99 g of the acid of the anionic fluorinated emulsifier was contained. The recovery rate of the acid of the anionic fluorinated emulsifier was 54.0%.

Example 10

In a 600 cc beaker, 20.0 g of the strongly basic ion exchange resin on which the anionic fluorinated emulsifier was adsorbed obtained in Example 7, 50.0 g of a 3N aqueous hydrochloric acid solution and 50.0 g of AE-3000 were put, followed by stirring for 60 minutes. Then, the beaker was left at rest, and a separated phase of AE-3000 was recovered, whereupon the concentration of the acid of the anionic fluorinated emulsifier in the phase was measured. In the recovered phase of AE-3000, 3.23 g of the acid of the anionic fluorinated emulsifier was contained. The recovery rate of the acid of the anionic fluorinated emulsifier was 34.9%.

Example 11

In a 500 ml three-necked flask, 20.4 g of the strongly basic ion exchange resin on which the anionic fluorinated emulsifier was adsorbed obtained in Example 7, and 24.0 g of a 11N aqueous hydrochloric acid solution were put, followed by stirring for 60 minutes. Then, the aqueous hydrochloric acid solution was removed, and the strongly basic ion exchange resin and 24.0 g of AE-3000 were stirred for 60 minutes. The concentration of the acid of the anionic fluorinated emulsifier in the AE-3000 phase was measured, whereupon 3.92 g of the acid of the anionic fluorinated emulsifier was contained, and the recovery rate of the acid of the anionic fluorinated emulsifier was 42.4%.

INDUSTRIAL APPLICABILITY

According to the method for recovering an anionic fluorinated emulsifier of the present invention, from a basic ion exchange resin on which an anionic fluorinated emulsifier is adsorbed, the anionic fluorinated emulsifier can be recovered with a high yield. Further, the non-aqueous fluorinated medium used to recover the anionic fluorinated emulsifier can be reused, thus leading to labor saving in waste disposal. Further, the recovered anionic fluorinated emulsifier may be used for e.g. emulsion polymerization of a fluoropolymer aqueous emulsion as it is or as an alkali metal salt or an ammonium salt after neutralized.

This application is a continuation of PCT Application No. PCT/JP2011/052175, filed on Feb. 2, 2011, which is based upon and claims the benefit of priority from Japanese Patent Application No. 2010-021754 filed on Feb. 3, 2010. The contents of those applications are incorporated herein by reference in its entirety.

What is claimed is:

1. A method for recovering an anionic fluorinated emulsifier, which comprises eluting, from a basic ion exchange resin on which an anionic fluorinated emulsifier is adsorbed, the anionic fluorinated emulsifier and recovering it as an acid of the anionic fluorinated emulsifier, wherein the basic ion exchange resin is brought into contact with a mixture of an aqueous inorganic acid solution and a non-aqueous fluorinated medium, a phase of the non-aqueous fluorinated medium is recovered, and the acid of the anionic fluorinated emulsifier is recovered from the phase of the non-aqueous fluorinated medium.

2. A method for recovering an anionic fluorinated emulsifier, which comprises eluting, from a basic ion exchange resin on which an anionic fluorinated emulsifier is adsorbed, the anionic fluorinated emulsifier and recovering it as an acid of the anionic fluorinated emulsifier, wherein the basic ion exchange resin is brought into contact with an aqueous inorganic acid solution and then brought into contact with a non-aqueous fluorinated medium, a phase of the non-aqueous fluorinated medium is recovered, and the acid of the anionic fluorinated emulsifier is recovered from the phase of the non-aqueous fluorinated medium.

3. The method for recovering an anionic fluorinated emulsifier according to claim 2, wherein after the basic ion exchange resin is bought into contact with an aqueous inorganic acid solution, the basic ion exchange resin is separated and recovered, and then brought into contact with the non-aqueous fluorinated medium.

4. The method for recovering an anionic fluorinated emulsifier according to claim 1, wherein the ratio of the aqueous inorganic acid solution and the non-aqueous fluorinated medium is such that the aqueous inorganic acid solution/the non-aqueous fluorinated medium=5/95 to 95/5 by the mass ratio.

5. The method for recovering an anionic fluorinated emulsifier according to claim 1, wherein the ratio of the basic ion exchange resin, the aqueous inorganic acid solution and the non-aqueous fluorinated medium is such that the basic ion exchange resin/(total amount of the aqueous inorganic acid solution and the non-aqueous fluorinated medium)=60/40 to 1/99 by the mass ratio.

6. The method for recovering an anionic fluorinated emulsifier according to claim 1, wherein the acid of the anionic fluorinated emulsifier is a fluorinated carboxylic acid.

7. The method for recovering an anionic fluorinated emulsifier according to claim 6, wherein the acid of the anionic fluorinated emulsifier is a $C_{5-7}$ fluorinated carboxylic acid which may have one to three etheric oxygen atoms.

8. The method for recovering an anionic fluorinated emulsifier according to claim 1, wherein the non-aqueous fluorinated medium is at least one member selected from the group consisting of a hydrofluorocarbon and a hydrofluoroether.

9. The method for recovering an anionic fluorinated emulsifier according to claim 8, wherein the non-aqueous fluorinated medium is at least one member selected from the group consisting of $CF_3CH_2OCF_2CF_2H$, $CF_3CH_2OCF_2CFHCF_3$, $(CF_3)_2CHOCF_2CF_2H$, $CF_3CH_2OCHFCHF_2$, $CF_3(CF_2)_3OCH_3$, $CF_3(CF_2)_4OCH_3$, $CF_3(CF_2)_3OCH_2CH_3$, $CF_3(CF_2)_4OCH_2CH_3$, $(CF_3)_2CFCF_2OCH_2CH_3$, $CHF_2CF_2CF_2CF_2CF_2CF_3$, $CF_3CF_2CF_2CF_2CH_2CH_3$, $CF_3CF_2CF_2CF_2CF_2CH_2CH_3$, $CF_3CF_2CHFCHFCF_3$, $CF_3CH_2CF_2CH_3$ and $CF_3CF_2CF_2CFHCH_3$.

10. The method for recovering an anionic fluorinated emulsifier according to claim 1, wherein the aqueous inorganic acid solution is at least one member selected from the group consisting of an aqueous hydrochloric acid solution, an aqueous sulfuric acid solution, an aqueous nitric acid solution and an aqueous phosphoric acid solution.

11. The method for recovering an anionic fluorinated emulsifier according to claim 1, wherein the concentration of the aqueous inorganic acid solution is from 0.1N to 13N.

12. The method for recovering an anionic fluorinated emulsifier according to claim 1, wherein the basic ion exchange resin is a strongly basic ion exchange resin.

13. The method for recovering an anionic fluorinated emulsifier according to claim 1, wherein the rest after the phase of the non-aqueous fluorinated medium is separated, is brought into contact with the non-aqueous fluorinated medium, the phase of the non-aqueous fluorinated medium is separated and recovered, and the acid of the anionic fluorinated emulsifier is recovered from the phase of the non-aqueous fluorinated medium.

14. The method for recovering an anionic fluorinated emulsifier according to claim 3, wherein the rest after the phase of the non-aqueous fluorinated medium is separated, is (A) brought into contact with a mixture of the aqueous inorganic acid solution and the non-aqueous fluorinated medium or (B) brought into contact with the aqueous inorganic acid solution, and then brought into contact with the non-aqueous fluorinated medium, the phase of the non-aqueous fluorinated medium is separated and recovered, and the acid of the anionic fluorinated emulsifier is recovered from the phase of the non-aqueous fluorinated medium.

* * * * *